US006153288A

United States Patent [19]

Shih et al.

[11] Patent Number: 6,153,288

[45] Date of Patent: Nov. 28, 2000

[54] INK-RECEPTIVE COMPOSITIONS AND COATED PRODUCTS

[75] Inventors: Frank Yen-Jer Shih, Arcadia; Kenneth S. C. Lin, San Marino, both of Calif.

[73] Assignee: Avery Dennison Corporation, Pasadena, Calif.

[21] Appl. No.: 08/899,562

[22] Filed: Jul. 24, 1997

[51] Int. Cl.[7] .............................. B32B 27/30; B41M 5/00; C08L 53/00; C08F 216/04; B05D 5/04

[52] U.S. Cl. .......................... 428/195; 428/331; 428/500; 428/507; 428/514; 428/522; 428/537.5; 428/411.1; 428/41.8; 347/105; 523/334; 525/55; 525/88; 526/310; 526/319; 526/923; 526/930; 427/261; 427/385.5; 427/391

[58] Field of Search .................................... 428/195, 323, 428/331, 500, 507, 514, 522, 523, 537.5, 411.1, 41.8, 352; 427/261, 288, 385.5, 391, 401; 347/105; 162/164.6, 164.7, 168.2, 168.7; 523/334; 525/55, 88, 95; 526/310, 318, 318.42, 319, 923, 930

[56] References Cited

U.S. PATENT DOCUMENTS

| | | | |
|---|---|---|---|
| 3,878,038 | 4/1975 | Opderbeck et al. | 162/167 |
| 3,889,270 | 6/1975 | Hoffmann et al. | 346/1 |
| 3,912,532 | 10/1975 | Simone | 106/308 |
| 4,090,013 | 5/1978 | Ganslaw et al. | 526/15 |
| 4,111,922 | 9/1978 | Beede et al. | 526/292 |
| 4,172,177 | 10/1979 | Sato | 428/413 |
| 4,248,685 | 2/1981 | Beede et al. | 204/159.22 |
| 4,252,852 | 2/1981 | Goth | 428/336 |
| 4,269,891 | 5/1981 | Minagawa | 428/335 |
| 4,299,748 | 11/1981 | Hashizume et al. . | |
| 4,301,195 | 11/1981 | Mercer et al. | 427/261 |
| 4,308,542 | 12/1981 | Maekawa et al. | 346/1.1 |
| 4,335,184 | 6/1982 | Miyamoto et al. | 428/342 |
| 4,352,901 | 10/1982 | Maxwell et al. | 524/38 |
| 4,371,582 | 2/1983 | Sugiyama et al. | 428/341 |
| 4,379,804 | 4/1983 | Eisele et al. | 428/332 |
| 4,399,193 | 8/1983 | Preiner et al. | 428/447 |
| 4,405,744 | 9/1983 | Greinecker et al. | 524/423 |
| 4,419,388 | 12/1983 | Sugiyama et al. | 427/288 |
| 4,425,405 | 1/1984 | Murakami et al. | 428/342 |
| 4,442,172 | 4/1984 | Oshima et al. | 428/342 |
| 4,446,174 | 5/1984 | Maekawa et al. | 427/261 |
| 4,474,847 | 10/1984 | Schröder et al. | 428/323 |
| 4,474,850 | 10/1984 | Burwasser | 428/336 |
| 4,478,910 | 10/1984 | Oshima et al. | 428/331 |
| 4,481,244 | 11/1984 | Haruta et al. | 428/155 |
| 4,489,122 | 12/1984 | Kammis et al. | 428/212 |
| 4,503,111 | 3/1985 | Jaeger et al. | 428/195 |
| 4,503,118 | 3/1985 | Murakami et al. | 428/323 |
| 4,517,244 | 5/1985 | Kobayashi et al. | 428/342 |
| 4,528,242 | 7/1985 | Burwasser | 428/413 |
| 4,544,580 | 10/1985 | Haruta et al. | 427/261 |
| 4,554,181 | 11/1985 | Cousin et al. | 427/261 |
| 4,564,560 | 1/1986 | Tani et al. | 428/411.1 |
| 4,592,951 | 6/1986 | Viola | 428/323 |
| 4,613,525 | 9/1986 | Miyamoto et al. | 427/256 |
| 4,617,239 | 10/1986 | Maruyama et al. | 428/452 |
| 4,642,247 | 2/1987 | Mouri et al. | 427/214 |
| 4,686,118 | 8/1987 | Arai et al. | 427/261 |
| 4,694,302 | 9/1987 | Hackleman et al. | 346/1.1 |
| 4,701,837 | 10/1987 | Sakaki et al. | 346/135.1 |
| 4,732,786 | 3/1988 | Patterson et al. | 427/261 |
| 4,741,969 | 5/1988 | Hayama et al. | 428/514 |
| 4,758,461 | 7/1988 | Akiya et al. | 428/212 |
| 4,780,356 | 10/1988 | Otouma et al. | 428/212 |
| 4,781,985 | 11/1988 | Desjarlais | 428/421 |
| 4,801,497 | 1/1989 | Kono et al. | 428/332 |
| 4,830,911 | 5/1989 | Kojima et al. | 428/342 |
| 4,849,286 | 7/1989 | Milne | 428/336 |
| 4,877,680 | 10/1989 | Sakaki et al. | 428/332 |
| 4,887,097 | 12/1989 | Akiya et al. | 346/135.1 |
| 4,914,451 | 4/1990 | Morris et al. | 346/1.1 |
| 4,956,230 | 9/1990 | Edwards et al. | 428/341 |
| 5,101,218 | 3/1992 | Sakaki et al. | 346/1.1 |
| 5,102,717 | 4/1992 | Butters et al. | 428/195 |
| 5,126,195 | 6/1992 | Light | 428/327 |
| 5,132,146 | 7/1992 | Maruyama et al. | 427/261 |
| 5,165,973 | 11/1992 | Kojima et al. | 428/331 |
| 5,190,805 | 3/1993 | Atherton et al. | 428/195 |
| 5,198,306 | 3/1993 | Kruse | 428/481 |
| 5,206,071 | 4/1993 | Atherton et al. | 428/195 |
| 5,208,092 | 5/1993 | Iqbal | 428/195 |
| 5,215,814 | 6/1993 | Gager et al. | 428/246 |
| 5,270,103 | 12/1993 | Oliver et al. | 428/219 |
| 5,302,436 | 4/1994 | Miller | 428/195 |
| 5,320,897 | 6/1994 | Kondo et al. | 428/195 |
| 5,328,748 | 7/1994 | Westfal | 428/195 |
| 5,364,702 | 11/1994 | Idei et al. | 428/423.1 |
| 5,380,587 | 1/1995 | Musclow et al. | 428/353 |
| 5,407,718 | 4/1995 | Popat et al. | 428/42 |
| 5,439,739 | 8/1995 | Furukawa et al. | 428/341 |
| 5,478,631 | 12/1995 | Kawano et al. | 428/212 |
| 5,494,759 | 2/1996 | Williams et al. | 428/514 |
| 5,496,635 | 3/1996 | Francis et al. | 428/352 |
| 5,501,902 | 3/1996 | Kronzer | 428/323 |
| 5,591,294 | 1/1997 | Sakaki et al. | 156/250 |
| 5,683,855 | 11/1997 | Shinkai et al. | 430/270.11 |
| 5,707,722 | 1/1998 | Iqbal et al. | 428/304.4 |
| 6,039,444 | 3/2000 | Mori et al. | 347/105 |
| 6,040,060 | 3/2000 | Missel et al. | 428/478.2 |

FOREIGN PATENT DOCUMENTS

| | | |
|---|---|---|
| 0100227A | 2/1984 | European Pat. Off. . |
| 0199874A | 11/1986 | European Pat. Off. . |
| 0233703A | 8/1987 | European Pat. Off. . |
| 0248667 | 12/1987 | European Pat. Off. . |
| 0294155A | 12/1988 | European Pat. Off. . |
| 0305478B | 3/1989 | European Pat. Off. . |
| 0405417B | 1/1991 | European Pat. Off. . |
| 0436230A | 7/1991 | European Pat. Off. . |
| 0461558A | 12/1991 | European Pat. Off. . |

(List continued on next page.)

*Primary Examiner*—Marie Yamnitzky
*Attorney, Agent, or Firm*—Christie, Parker & Hale, LLP

[57] ABSTRACT

Coatable ink-receptive compositions and coated substrates are provided. The compositions contain a pigment dispersed in a binder composed of an ethylene vinyl acetate emulsion polymer and at least one water soluble, cationic polymer, such as polydiallyldimethylammonium chloride and copolymers of a quaternary amino acrylate or methacrylate and a hydroxy-lower alkyl acrylate or methacrylate. Papers, films, labels and similar products, coated with an ink-receptive composition, are also provided.

36 Claims, No Drawings

FOREIGN PATENT DOCUMENTS

| | | |
|---|---|---|
| 0482835A | 4/1992 | European Pat. Off. . |
| 0482836A | 4/1992 | European Pat. Off. . |
| 0482837A | 4/1992 | European Pat. Off. . |
| 0482838A | 4/1992 | European Pat. Off. . |
| 0484016A | 5/1992 | European Pat. Off. . |
| 0487350A | 5/1992 | European Pat. Off. . |
| 0529797A | 3/1993 | European Pat. Off. . |
| 0545470 | 6/1993 | European Pat. Off. . |
| 0595522A | 5/1994 | European Pat. Off. . |
| 0627324 | 12/1994 | European Pat. Off. . |
| 0634288 | 1/1995 | European Pat. Off. . |
| 0655346 | 5/1995 | European Pat. Off. . |
| 0705704 | 4/1996 | European Pat. Off. . |
| 0830952 | 3/1998 | European Pat. Off. . |
| 19516111A1 | 11/1996 | Germany . |
| 60-083882 | 5/1985 | Japan . |
| 8176428 | 9/1996 | Japan . |
| WO9207722 | 5/1992 | WIPO . |
| WO9301938 | 2/1993 | WIPO . |
| WO9304869 | 3/1993 | WIPO . |
| WO9304871 | 3/1993 | WIPO . |
| WO9500340 | 1/1995 | WIPO . |
| WO9513328 | 5/1995 | WIPO . |
| WO9618496 | 6/1996 | WIPO . |
| WO9626840 | 9/1996 | WIPO . |
| WO9701448 | 1/1997 | WIPO . |

INK-RECEPTIVE COMPOSITIONS AND COATED PRODUCTS

FIELD OF THE INVENTION

The present invention relates to coatable, water-based compositions for enhancing the ink-receptiveness of imprintable substrates, and coated products made with such compositions.

BACKGROUND OF THE INVENTION

As personal computers continue to grow in popularity and use, demand for high quality peripherals, such as printers, and associated components, such as paper and label stock, also continues to grow. A variety of printers are known, including dot matrix, laser, and ink jet printers. In recent years, ink jet printers have enjoyed growing popularity, in part due to the availability of colored inks.

As computer technology has improved and developed, and new software and printer designs have enabled a tremendous variety of fonts, designs, and even photographs to be printed with computer printers, demand for high quality films, papers, labels, and similar imprintable substrates has also grown. Although efforts have been made to produce high quality ink-receptive sheet materials, such as films, papers and labels, a continuing need exists for high quality, ink-receptive constructions, particularly ink jet-imprintable constructions, characterized by high resolution, high color density, good color gradation, and other print qualities, as well as a need for materials that facilitate fast drying of water-based inks, smudgeproofness, waterfastness, and compatibility with both pigment-based and dye-based inks. The ideal product should be low cost and easily processed, and usable with a variety of inks and printing conditions.

SUMMARY OF THE INVENTION

In accordance with the present invention, coatable, ink-receptive compositions and coated products are provided. In one embodiment, an ink-receptive, coatable composition comprises a pigment dispersed in or mixed with a binder which comprises an ethylene-vinyl acetate emulsion polymer and at least one water soluble, cationic polymer. The cationic polymer fixes acid dye colorants in water-based inks, and diminishes dye diffusion. Preferably, the binder includes at least two water soluble, cationic polymers, namely, (1) a polymerized diallyldimethylammonium compound and (2) a copolymer of dimethylaminoethyl acrylate or methacrylate and at least one hydroxy-lower organic acrylate or methacrylate, with hydroxyethyl acrylate (HEA) and hydroxyethyl methacrylate (HEMA) being most preferred. In some embodiments, a nonionic or cationic surfactant is included within the binder mixture to enhance print quality of the coating. A preferred ink-receptive composition has, on a percent by weight (dry weight) basis, about 15–70% EVA emulsion polymer, about 5–50% of at least one water soluble, cationic polymer, about 20–60% pigment (s), and up to about 10% of one or more surfactants.

When coated on paper or film face stock or label stock, the ink-receptive compositions provide coated products that work particularly well with ink jet printers and have a high degree of ink-receptivity toward both pigment-based and dye-based inks, colored as well as black. Improvements are seen in color density, resolution, color gradation, drying time, smudgeproofness and water-fastness. Printed images on the coated products provided by the invention are crisp and have very low bleed. The coatings tend to be hydrophilic, yet water resistant, and quickly absorb water-based inks without becoming tacky or suffering a loss of integrity.

In one aspect of the invention, a water resistant, wide format or narrow format graphic construction suitable for use indoors or outdoors is provided, and comprises a substrate having first and second surfaces (or multiple inner and outer surfaces), an ink-receptive coating as described herein on the first surface of the substrate, an inked image imprinted on the coated substrate, and an adhesive coated on or applied to the second surface of the imprinted substrate. Ink jet-imprinted graphic constructions are readily made using wide format or narrow format ink jet printers. Once made, the constructions can be adhered to any object having a surface capable of receiving the constructions, such as billboards, other outdoor signage, the walls of buildings, buses, etc.

DETAILED DESCRIPTION

The present invention provides coatable, ink-receptive compositions and coated products, such as papers, films, labels and similar constructions. In one embodiment, an ink-receptive composition comprises a pigment dispersed in a binder which comprises an ethylene-vinyl acetate ('EVA") emulsion polymer and at least one water soluble, cationic polymer.

EVA polymers (more precisely, copolymers) are generally hydrophobic (in bulk), have glass transition temperatures ($T_g$) ranging from about −15° C. to 25° C., and tend to form films at relatively low temperatures. In contrast, vinyl acetate homopolymer has a $T_g$ of about 30° C., and does not form films at room temperature.

Where the composition is to be applied to a paper substrate, it is preferred that the composition have a high solids content, in order to minimize curling of the paper substrate during the coating process, and to ease drying of the coating. High solids content EVA emulsion polymers are available from Air Products & Chemicals, Inc., Allentown, Pa., under the AIRFLEX trademark. Examples include AIRFLEX 465™ (65% solids) and AIRFLEX 7200™ (72–74% solids). Another suitable EVA emulsion polymer is AIRFLEX 426™, a high solids, carboxylated, EVA polymer partially functionalized with carboxyl groups. This polymer is thought to improve the water resistance of the resulting ink-receptive coating, particularly when a coated paper substrate is imaged with a dye-based ink. It is believed that the AIRFLEX brand EVA emulsion polymers are stabilized with up to about 5% by weight polyvinyl alcohol (PVOH) and/or, in some formulations, a nonionic surfactant. EVA emulsion polymers used in the present invention preferably have a solids content of from about 40 to 75%.

The EVA emulsion polymer preferably comprises from about 15 to 70%, more preferably from about 25 to 65% by weight of the ink-receptive composition, on a dry weight basis (meaning that water is not included in the calculation of the compositional percentages).

Water soluble, cationic polymers useful in the practice of the present invention include, but are not limited to, quaternary ammonium polymers (also known as polyquatemary ammonium salts, polyquats and quaternary polymers). Non-limiting examples of quaternary ammonium polymers include polydiallyldimethylammonium compounds and copolymers of quaternary dimethylaminoethyl acrylate or methacrylate and one or more hydroxy-lower organic acrylate or methacrylate, for example, hydroxyethyl acrylate (HEA) and hydroxyethyl methacrylate (HEMA). To maintain charge neutrality, a monovalent or divalent counterion, Z, is associated with each quaternary ammonium center. Nonlimiting examples of such counterions include halides, (for example, chloride) and dimethylsulfate anion.

As used herein, the term "hydroxy-lower organic acrylate or methacrylate" refers to an acrylic or methacrylic acid ester, the ester group of which is a straight- or branched-chain alkyl, alkenyl, alkynyl or ether group containing from 1 to about 6 carbon atoms, substituted with at least one hydroxy group at a primary or secondary carbon. Nonlimiting examples of such groups include hydroxy-substituted methyl, ethyl, propyl, vinyl, allyl and propynyl groups.

A particularly preferred, water soluble, cationic polymer is poly(diallyldimethylammonium chloride) (PDADMAC), available from CPS Chemical Co., (Old Bridge, N.J.) as a low, medium, or high molecular weight polymer. In general, low molecular weight, water soluble, cationic polymers are preferred, as they tend to have lower viscosities and allow high solids content formulations to be prepared without sacrificing coatability. The chloride ions in PDADMAC can be exchanged for different monovalent or divalent counterions by, e.g., dissolving the polymer in a suitable solvent and passing the solution through an ion exchange resin. Poly(diallydimethylammonium dimethyl sulfate) is another preferred, water soluble, cationic polymer.

Although not bound by theory, it is believed that poly (diallyldimethylammonium) compounds have a variety of polymer geometries which depend on the manner in which individual monomers link up during polymer chain propagation. Representative, nonlimiting examples of the repeat units for such polymeric compounds include formulas (I)–(III) and mixtures thereof:

(I)

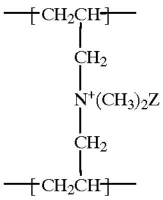

(II)

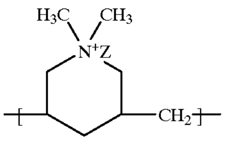

(III)

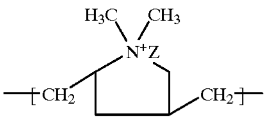

where Z is as defined above.

Other preferred, water soluble, cationic polymers include copolymers of quaternary dimethylaminoethyl acrylate or methacrylate and one or more hydroxy-lower organic acrylate or methacrylate, which have the general formula (IV):

(IV)

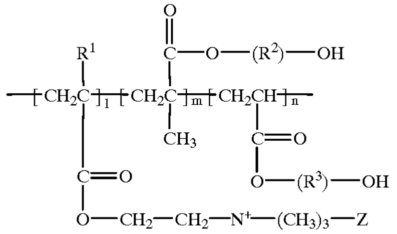

wherein $R^1$ is hydrogen or methyl; $-(R^2-OH)$ and $-(R^3-OH)$ are, independently, lower alkyl, alkenyl, alkynyl or ether substituted with a hydroxyl group at a 1° or 2° carbon; 1>0; m ≧0; n≧0, provided that m and n are not both zero; and Z is as defined above.

Water soluble, cationic polymers of formula (IV) can have a variety of geometries, depending on whether the individual monomers are polymerized head-to-head, head-to-tail, randomly, in fixed sequence (e.g., ABABAB . . . ), in blocks, or in some other manner. No specific geometric arrangement of monomers is intended by the formulas presented herein.

Copolymers of quaternary dimethylaminoethyl acrylate or methacrylate and one or more hydroxy-lower alkyl acrylate or methacrylate are prepared using standard polymerization techniques, for example, free radical polymerization. Thus, a terpolymer of quaternary dimethylaminoethyl acrylate (DMAEA), hydroxyethyl acrylate and hydroxyethyl methacrylate is readily made by heating a mixture of the monomers in the presence of a free radical initiator, optionally by varying the rate of addition of monomers and/or initiator to the reaction mixture. As but one nonlimiting example, a preferred terpolymer of HEA, HEMA and quaternary DMAEA (with DMS as counterion), may comprise, on average, from about 18 to 37 HEA monomer units, 52 to 74 HEMA monomer units, and about 5 to 17 quaternary DMAEA monomer units.

Nonlimiting examples of suitable polymerization initiators include water- and/or alcohol-soluble initiators, for example persulfates, such as sodium persulfate and potassium persulfate; peroxides, such as hydrogen peroxide and tert-butyl hydrogen peroxide; and azo compounds, such as VAZO™ initiators; used alone or in combination with one or more reducing agents or activators.

To control polymer chain length, a chain transfer agent or other molecular weight regulator can be added to the polymerization mixture. Nonlimiting examples include 2-mercapto ethanol, n-dodecyl mercaptan (n-DDM), t-dodecyl mercaptan (t-DDM), monothioglycerol, mercapto acetates, and long chain alcohols. Water soluble chain transfer agents, such as 2-mercapto ethanol, are preferred. In some embodiments, a small amount of polyethylene glycol (e.g., PEG 1000) or similar nonionic, water soluble polymer can be added to the reaction mixture as a dispersion medium and/or to increase the solids content of the resulting polymer.

The water soluble, cationic polymer(s) comprise(s) from about 5 to 50% by weight (on a dry weight basis) of the coatable formulation, with a mixture of cationic polymers being preferred. More preferably, the water soluble, cationic polymer comprises a mixture of about one-third poly (diallyldimethylammonium) compound and two-thirds copolymer of quaternary dimethylaminoethyl acrylate or methacrylate and one or more hydroxy-lower organic acrylate or methacrylate.

In a preferred embodiment of the invention, the binder further includes one or more cationic or nonionic surfactants, which help to wet the pigment and/or enhance print quality of the resulting composition. Nonlimiting examples of nonionic surfactants include alkylphenol ethoxylates, such as nonylphenol ethoxylate, and Disponil A 3065, an ethoxylated nonionic surfactant available from Henkel of America Inc. (King of Prussia, Pa). A nonlimiting example of a cationic surfactant useful in the practice of the invention is hexadecyl trimethylammonium chloride (HDTMAC), available from Akzo Nobel Chemicals Inc. (Chicago, Ill.). Anionic surfactants should be avoided because of their likely electrostatic interaction with the cationic, water soluble polymer(s).

Preferably, up to about 10% by weight (on a dry weight basis) of one or more surfactants is employed in the ink-receptive composition. Too much surfactant can potentially cause the coating to have air bubbles, which could adversely effect print quality when coated on film substrates. Other components, such as thickeners and defoamers can be added to the formulation to improve processability.

Pigments useful in the ink-receptive compositions of the present invention include materials that increase the opacity and/or modify the porosity of the coated substrate. Inorganic pigments are especially preferred; nonlimiting examples include silica (preferably, amorphous silica gels), silicic acid, clays, zeolites, alumina, $TiO_2$, $MgCO_3$ and the like. The pigment increases the ink-absorbtivity and improves the print quality and water resistance of the dried coating, and enables the coating to be used with water-based inks containing a dye colorant, as well as pigmented, water-based inks. Preferred ink-receptive compositions prepared in accordance with the present invention contain from about 20 to about 60% by weight pigment, based on the dry weight of EVA emulsion polymer, water soluble, cationic polymer, and pigment. Below about 20% by weight pigment, print quality may suffer, though this can be controlled, in part, by adjusting average particle size of the pigment and/or the binder-to-pigment ratio. Without pigment in the composition, drying rates of some inks printed on the coated substrate tend to be undesirably low. However, in those applications where drying time is less of a concern, the pigment can be omitted.

In addition to the pigment(s) included to increase the opacity and/or modify the porosity of the coated substrate, in one embodiment of the invention an additional pigment is added to increase the adhesion of the coating to the substrate and, preferably, to balance the overall properties of the coating, including, for example, improvement of the cohesive strength of the coating. A preferred but nonlimiting example of such a pigment is a colloidal dispersion silica, such as Ludox CL-P™, available from DuPont de Nemours, E.I., Co. (Wilmington, Del.).

Coatable, ink-receptive compositions are readily prepared by blending surfactant, EVA emulsion polymer, quaternary ammonium polymer(s), and pigment(s), preferably in that order. More preferably, additional surfactant is added prior to the introduction of pigment to the formulation.

In a second aspect of the invention, ink-receptive coated constructions or products, such as papers, cardboard, corrugated boards, films, labels, and other porous or nonporous substrates are provided, and comprise substrates coated with an ink-receptive composition as described herein. When cut to size, the coated products are particularly well suited for use in ink jet and other printers and provide excellent print quality when imprinted with black, as well as colored, water-based inks, including inks colored with either a pigment or a dye.

Both "wide format" and "narrow format" ink-receptive products are encompassed by this aspect of the invention. Wide format products are generally manufactured as wide rolls (24 or more inches wide), and are roll-fed into large printers for imaging. They are typically employed in commercial settings, and include, without limitation, movie theater posters, outdoor signage, large advertisements, and the like. Narrow format products are generally manufactured as narrow rolls or individual sheets, and can be roll-fed or sheet-fed into printers for imaging. They are typically used in the office or home, and include, without limitation, computer printer paper, labels, transparencies, and the like.

Wide format and narrow format ink-receptive products differ not only in size, but also in ink capacity, durability, and other properties, and are often exposed to different use environments. For example, wide format products may encounter more ink per unit area when run through certain commercial printers. Problems with poor image quality, color bleed, and smearing can be avoided by enhancing the ink-absorbtivity of the imprintable substrate—for example, by adding more pigment to the coating composition.

Durability, including waterfastness, resistance to light-induced fading, abrasion resistance, color stability, and other properties also can differ between wide format and narrow format products. The present invention is intended to meet the more rigorous demands placed on wide format products, including products intended for outdoor use, as well as the durability demands placed on narrow format products. To improve overall durability of the composition, the binder can be modified by adding a crosslinker. Suitable crosslinkers include, without limitation, multifunctional polyisocyanates, melamine formaldehyde resins, and urea formaldehyde resins. Although not bound by theory, it is believed that such crosslinkers promote the formation of network structures during or after drying of the compositions on the face stock or label stock.

Coatable substrates useful in the practice of the present invention include paper, cardboard, corrugated board, plastic film, and metal film or foil face stocks and label stocks traditionally used for ink printing applications, particularly ink jet printing. Self-wound materials and other linerless products are also suitable substrates. Nonlimiting examples include self-wound tapes. Nonlimiting examples of paper face stocks suitable for use with the present invention include offset, bond, text, cover, index, lightweight printing paper, litho paper, and sulfite paper. Although not required, a surface treatment, such as starch, sizing agents, and the like, can be included on the paper substrates. Nonlimiting examples of plastic face stocks suitable for use with the present invention include polystyrene, polyvinyl chloride, polyester, nylon and polyolefin (for example, polyethylene) films. Polymer blends are also included in this list of examples. The films may be cast, extruded, or coextruded. A film substrate comprising a coextruded polyolefin-polybutylene terephthalate sandwich can be used in the present invention. A nonlimiting example of a metal face stock suitable for use with the present invention is aluminum foil.

Coatable label stocks useful in the practice of the present invention include without limitation, a variety of printable label constructions or assemblies well known in the art, each typically comprising a label face stock (sheet or roll) having at least one inner and at least one outer surface, a pressure-sensitive adhesive (PSA) adhered to at least one inner surface of the label face stock, and a removable release liner abutting the PSA, the entire assembly forming a sandwich-like construction.

An ink-receptive coated product is easily made by applying an ink-receptive composition as described above to one or both surfaces of a face stock or label stock, using a conventional coating or other application technique. Nonlimiting examples of such techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. The composition can also be applied to paper substrates in a size press, during paper manufacture. For label products, the composition can be applied using any conventional technique or process, including without limitation, coating "on-press" during the converting process (e.g., in concert with the processes of die-cutting, matrix stripping, etc.), coating off-press using a separate coater, and other application methods.

In general, dry coat weights of from about 5 to 70 g/$m^2$ are preferred, depending on the particular face or label stock employed. Thus, coated paper face stocks are advantageously prepared with composition coat weights of from about 5 to 30 g/$m^2$, more preferably about 15 to 25 g/$m^2$. Vinyl (PVC) substrates are more preferably coated with from about 40 to 70 g/$m^2$ of ink receptive composition.

Using the ink-receptive compositions and coated products described herein, high quality imprinted constructions are prepared by running the constructions through a printer and imprinting an image thereon. Advantageously, the compositions and coated products are designed to perform well with a variety of printer technologies including, without limitation, piezoelectric printer heads, thermal imaging, drop on demand, and other technologies. A particularly preferred aspect of the invention is the finished product—an imprinted (inked) construction comprising a face or label stock having at least one inner surface and at least one outer surface, imprinted with a high quality black and/or colored image. As but one example, this aspect of the invention is embodied by an ink jet-imprinted construction comprising a porous or nonporous substrate (face stock or label stock), coated with an ink-receptive composition and imprinted with an ink image. In some embodiments, the construction is die cut.

EXAMPLES

The following nonlimiting examples are illustrative of the invention.

Polyquat A

A monomer mixture consisting of 40 g HEA, 100 g HEMA and 40 g of an 80% by weight aqueous solution of quaternary dimethylaminoethyl acrylate-dimethyl sulfate ("DMAEMA-DMS, 80% active") was prepared, with stirring, and contained, on a percent by weight (dry weight) basis, 23% HEA, 58% HEMA and 19% DMAEMA-DMS.

A 4-neck, 1000 ml flask equipped with a thermometer, stirrer and condenser was charged with 100 g $H_2O$, 60 g polyethylene glycol 1000 and 16% of the monomer mixture (29 g), and heated to 60° C., at which time 5 g of a mixture of 27 g $H_2O$ and 3 g sodium persulfate was added.

The contents of the flask were heated to 95° C. and, 5 min. later, the remainder of the monomer mixture was added over a 100 min. period. Simultaneously, 25 g of the persulfate/water mixture was added over a 120 min. period.

The contents of the flask were held at a constant temperature of 95° C. for one additional hour, and then 70 g $H_2O$ was added, thereby cooling the mixture.

When the temperature rose to 60° C., 0.5 g of a 30% by wt. aqueous solution of $H_2O_2$ was added, and a mixture of 15 g $H_2O$ and 0.5 g sodium formaldehyde sulfoxylate (a redox agent) was slowly added over 15 min. Another 0.5 g $H_2O_2$ was then added, the contents of the flask were allowed to cool, and aqueous NaOH (10% by wt.) was added to raise the pH of the polymeric solution to 5.

Polyquat B

A copolymer of 17% HEA, 45% HEMA and 64% DMAEMA-DMS was prepared in the same manner as Polyquat A, except the monomer mixture consisted of 30 g HEA, 78 g HEMA and 80 g of an 80% active solution of DMAEMA-DMS.

Coatable, Ink-Receptive Compositions

Examples 1 and 2 and Comparative Example 1

In Example 1, a coatable, ink-receptive composition containing a single cationic, water soluble polymer (PDADMAC) was prepared by blending the following components together in the order listed: 2 g Disponil A 3065, 18 g Airflex 7200 EVA emulsion polymer, 5 g Agefloc Wt50SLV (a poly(diallyldimethylammonium chloride from CPS Chemical Co.)); 2 g hexadecyl trimethylammonium chloride (HDTMAC); and 10 g Silcron G-100 (a silica powder available from SCM Chemical). The resulting composition had a solids content of 38.2% (by weight).

In Example 2, a coatable, ink-receptive composition was prepared as in Example 1, except 10 g of Agefloc Wt50SLV was used. Solids content was 40.6%.

As a control, Comparative Example 1 (C-1), a coatable, ink-receptive composition, was prepared as in Example 1, except that no PDADMAC was included and 25 g Airflex 7200 was used. Solids content was 35.0%.

Examples 3 and 4

In Example 3, a coatable, ink-receptive composition containing two cationic, water soluble polymers (PDADMAC and Polyquat A) was prepared by blending the following components together in the order listed: 2 g Disponil A 3065; 9 g Airflex 7200; 10 g Agefloc Wt50SLV; 20 g Polyquat A; 2 g HDTMAC; and 8 g Silcron G-100. Solids content was 38.8%.

In Example 4, a coatable, ink-receptive composition was prepared as in Example 3, except 18 g Airflex 7200, 5 g Agefloc Wt50SLV, 10 g Polyquat A, and 10 g Silcron G-100 were used. Solids content was 42.2%.

Example 5

In Example 5, a coatable, ink-receptive composition containing a single water soluble, cationic polymer (Polyquat B) was prepared by blending the following components together in the order listed: 2 g Disponil A 3065; 18 g Airflex 7200; 15 g Polyquat B; 2 g HDTMAC; and 10 g Silcron G-100. Solids content was 42.2%.

Examples 6 and 7

In Example 6, a coatable, ink-receptive composition containing two water soluble, cationic polymers (PDADMAC and Polyquat B) was prepared by blending the following components together in the order listed: 2 g Disponil A 3065, 18 g Airflex 7200; 5 g Agefloc Wt50SLV; 10 g Polyquat B; 2 g HDTMAC; and 10 g Silcron G-100. Solids content was 42.2%.

In Example 7, a coatable, ink-receptive composition was prepared as in Example 6, except 10 g Agefloc Wt50SLV was used. Solids content was 41.7%.

Example 8

In Example 8, a coatable, ink-receptive composition was prepared as in Example 4, except Gasil® HP39 (a synthetic, amorphous silica gel, available from Crosfield Company (Joliet, Ill.)) was used as pigment, with minor differences in the quantities of the other ingredients.

Table 1 provides a summary of the formulations of Examples 1 to 8 and Comparative Example 1, with the relative amount of each component expressed as a percentage by weight, on a dry weight basis.

TABLE 1

| Example | Disponil A 3065 | Airflex 7200 | Agefloc Wt50SLV | Polyquat A | Polyquat B | HDTMAC | Silcron G-100 | Gasil HP39 |
|---|---|---|---|---|---|---|---|---|
| | Formulation by Percentage of Dry Weight | | | | | | | |
| C-1 | 4 | 61 | — | — | — | 2 | 33 | — |
| 1 | 5 | 48 | 9 | — | — | 2 | 36 | — |
| 2 | 4 | 44 | 17 | — | — | 2 | 33 | — |
| 3 | 4 | 21 | 16 | 32 | — | 2 | 25 | — |
| 4 | 4 | 40 | 8 | 15 | — | 2 | 31 | — |
| 5 | 4 | 40 | — | — | 23 | 2 | 31 | — |
| 6 | 4 | 40 | 8 | — | 15 | 2 | 31 | — |
| 7 | 4 | 38 | 14 | — | 14 | 2 | 28 | — |
| 8 | 3 | 36 | 7 | 14 | — | 2 | — | 38 |

Coatable Products

To evaluate the ink-receptivity of the compositions described above, a series of coating and printing trials were conducted, using paper labels coated with the compositions of Examples 1 to 7 and C-1. The labels had the following characteristics:

Label Stock

Type: uncoated litho paper, pre-primed with 30% polyvinyl acetate and 70% silicate (primer coated on one side to enhance adhesion of the PSA)
Basis weight: 50 lb/ream
Caliper: 4.3±0.25 mil (approx. 0.1 mm)
Sizing: none
Dimensions: 25×38 in. (63.5×96.5 cm)
Manufacturer: CBC Coating, Inc., Neenah, Wis.

PSA

Type: removable acrylic-based PSA
Coat weight: 11±1 $g/m^2$
Manufacturer: Avery Dennison Corporation Release Liner Type: Presiliconized release liner, one side silicone coated
Basis weight: 50 lb/ream
Caliper: 3.2±0.3 mil (approx. 0.08 mm)
Manufacturer: Rhinelander Paper, Rhinelander, Wis.
Dimensions: 25×36 in. (64×91 cm)

Each of eight label constructions was coated on its imprintable surface (the face opposite the release liner) with one of the compositions of Examples 1 to 7 and C-1, using a slot die coater. Coat weights were about 25 $g/m^2$, measured after drying in an oven heated to 180° F. (82° C.).

Each coated construction was fed through a Hewlett Packard 820CSE Color Desk Jet, 4-color, ink jet printer having water-based inks with dye colorants (except black, which was pigmented); printed with an image; and evaluated for color density (a dimensionless measurement of the light reflection density of the printed image), in an IQ-150 Graphics Arts densitometer, manufactured by Tobias Associates, Inc. Within a particular region characterized by a specific color, three or four independent measurements of color density were taken. The measurements were averaged, and the results are presented in Table 2. High color densities are preferable to low color densities, and a difference of 0.05 units or more is considered significant.

TABLE 2

| Example | Blue | Green | Magenta | Black | Yellow | Red | Cyan |
|---|---|---|---|---|---|---|---|
| | Color Density on Paper Labels | | | | | | |
| C-1 | 1.39 | 1.27 | 1.36 | 1.45 | 1.05 | 1.15 | 1.43 |
| 1 | 1.57 | 1.43 | 1.50 | 1.46 | 1.10 | 1.25 | 1.62 |
| 2 | 1.58 | 1.45 | 1.52 | 1.47 | 1.16 | 1.25 | 1.65 |
| 3 | 1.60 | 1.57 | 1.57 | 1.29 | 1.25 | 1.42 | 1.58 |
| 4 | 1.53 | 1.44 | 1.45 | 1.46 | 1.13 | 1.28 | 1.52 |
| 5 | 1.50 | 1.30 | 1.44 | 1.44 | 1.11 | 1.20 | 1.60 |
| 6 | 1.57 | 1.51 | 1.52 | 1.48 | 1.17 | 1.30 | 1.58 |
| 7 | 1.62 | 1.51 | 1.57 | 1.48 | 1.22 | 1.33 | 1.62 |

As shown in Table 2, each of the examples exhibited color densities higher than those exhibited by the control. Compositions formulated with Polyquat A or B performed particularly well.

Comparative Testing on a Variety of Printers

Samples of three different ink jet products were fed through 16 different ink jet printers, printed with an image, and evaluated for overall print quality, ink drying time, optical density and waterfastness.

Printers

The following ink jet printers were used to test different ink jet imprintable products: Hewlett Packard-HP500C, 560, 682C, 693C, 850C, 1200C, and 1600C; Canon (Bubble Jet) BJ-200e, BJC-600, BJC 4200, BJC 4200 photo, and BJC 4200 Neon; Epson Stylus Color II, 500 and 1500. The "Plain Paper" and "Normal" print quality settings were selected on the printer drivers.

Test Methods and Equipment

Evaluations of black and color print quality (PQ) were made using a GTI Color Matcher, Model CMB, color matching booth, with a D65 setting, in the following areas: black text and solid (area) fills; color text and solid (area) fills; color to color bleed; and color intensity of green, yellow, cyan, magenta and red color fills. Ambient temperature and relative humidity were 72° F. (22° C.) and 50%, respectively.

Optical density and waterfastness were measured using an X-rite densitometer, Model No. 428. For those printers with pigmented black inks, the drip test for image permanence was performed on black, cyan, magenta and yellow. For all other printers, the drip test was performed on black ink only.

The overall print quality (PQ) of printed text, denoted A1 (black) and C1 (color), represents a combination of two properties of printed text: feathering/wicking and spraying. Feathering/wicking is a common characteristic of ink-paper interactions that cause degradation in print quality. The primary phenomenon is one of ink flow along the length of paper fibers, causing protrusions out of the main body of the text. It causes fuzzy edges, spidery lines and poor print quality. Spraying is a characteristic of the printer type and the paper, and occurs when ink splatters or sprays outside of the test region. It shows up in the trailing edge of the print. To evaluate these two properties, a short word or phrase was printed and the text was examined under 5× magnification. Overall print quality was expressed by rating the level of feathering/wicking and spraying using a 4-point scale, wherein 1=severe; 2=moderate; 3—slight; and 4=no feathering/wicking or spraying.

The overall print quality (PQ) of printed solid regions or graphics, referred to as "area fill" and denoted B1 (black) and D1 (color) represents a combination of three properties of printed graphics: mottling, cascading and bronzing. Mottling refers to a non-uniformity in printing that occurs when ink follows patterns in the paper as a result of non-uniform ink-paper interactions. This leads to non-uniformity of the image density. Cascading is a deficiency in coverage of a 100% area fills. It manifests itself as low density bands between print swaths. Bronzing is a characteristic of ink-paper interactions that manifests itself as a bronze sheen in area fills. To evaluate printed solid regions or graphics for these characteristics, the solid area of a black or colored region of a printed sample was compared to a control sample: a color optimized ink jet label sheet having no die-cuts (equivalent to label product nos. 8250 and 8253, sold by Avery Dennison Corporation). Overall area fill print quality was then evaluated by rating the level of mottling, cascading and bronzing using a 4-point scale, wherein 1=severe, 2=moderate, 3=slight, and 4=no mottling, cascading and/or bronzing.

Printed color graphics were also evaluated for color-to-color bleed, denoted D2, a common characteristic of ink-paper interactions that cause a degradation in print quality wherein one color bleeds into an adjacent color. Black-to-yellow color bleed is the most noticeable. This characteristic was measured by evaluating (a) line growth, an increase in the width of a printed line, and (b) edge roughness, protrusions out of the main body of a line into the adjacent background color. To evaluate color-to-color bleed, a multicolor graphic image was printed, preferably as a yellow, red and green object outlined in black. Using a magnification of 5X, the sample was evaluated for bleed areas and compared to the performance of the Avery Dennison color optimized control sample identified above. The results were expressed using a 4-point scale, wherein 1=severe (unacceptable), 2=moderate, 3=slight, and 4=no color-to-color bleed.

Overall color intensity of the colors blue, green, yellow, cyan, magenta, and red was evaluated by printing a color image and examining it for overall appearance of each color. A 4-point scale was used to rate the color intensity, wherein 1=dull, 2=average, 3=bright, and 4=very bright.

Total numerical values for the print quality evaluations are also presented, and represent a weighted average of the ratings, namely, A1, B1 and C1 each contribute 25% of the overall total numerical value, and D1, D2 and D3 each contribute 8.3% of the total numerical value.

Ink drying times (in minutes and seconds) were measured for black text (A2), black graphics, or, area fill (B3), color text (C2), and color graphics or area fill (D4). In each test, a textual or graphic image was printed on a sample media. As the sample was ejected from the printer, a timer was started and the sample placed print side up on a flat surface. At the same time, the printed page was gently wiped with a Kimwipe™, without added force, across the printed text or solid area fill. If no ink was transferred to the Kimwipe™, the drying time was recorded as zero. If the Kimwipe™ showed any ink transfer, the imaged region was checked at 5 second intervals, with wiping, until no more ink transferred to the Kimwipe™. The total elapsed time required to dry the ink was recorded.

The image permance of black images was evaluated by measuring optical density, denoted B3, in the manner described above, and by measuring waterfastness, denoted E1, using a drip test. Waterfastness is an expression of the amount of (black) colorant transferred from a printed area to an unprinted area when deionized water is dispensed at a 45° angle on a printed sample. A sample was printed with a series of parallel bars and allowed to dry for 1 to 1.25 hours, then placed at a 45° angle such that the bars were horizontal. A 250 $\mu$L pipette was filled with deionized water, and its tip was placed 5–10 mm above the top horizontal bar of the printed sample. The water in the pipette was then dispensed on to the sample. A second drip was commenced in the same way, starting about 2.5 mm from the first drip line (a vertical path down the sample) without allowing the streams to merge. 15 seconds after the second drip was dispensed, the sample was removed to a flat surface and allowed to dry for at least 10 minutes. Thereafter, the optical density of the transferred colorant was measured with a densitometer, taking 5 readings at just below each of the first 5 horizontal bars, for each of the two drips. (A 4mm aperture reflective densitometer was used.) The optical density measurements were averaged, for each of the two groups. Similarly, optical density readings from an un-imaged area of the sample were taken (drip 2). Water resistance was calculated by subtracting the measurements obtained above (drip 1 minus drip 2), and comparing the results with the color-optimized Avery Dennison control sample identified above.

The waterfastness, E1, of yellow, cyan and magenta colored images was also evaluated, using the drip test procedure described above.

Example 9

In Example 9, several samples of a glassine ink-jet paper label product (Avery Dennison 8800) were coated in a slot die coater with an ink-receptive composition containing PDADMAC and Polyquat A (prepared as in Example 4), to a dry coat weight of about 25 $g/m^2$; printed with an image in several ink jet printers; and evaluated for print quality, color intensity, drying time and image permanence (waterfastness). The results are presented below in Tables 3 and 4.

Comparative Example 2

In Comparative Example 2 (C-2), several samples of an uncoated, glassine ink jet paper label product (Avery Dennison 8800) were printed with an image in several ink jet printers, and evaluated for print quality, color intensity, drying time and image permanence. The results are presented below in Tables 5 and 6.

Comparative Example 3

In Comparative Example 3 (C-3) several samples of a 1.5 mil thick, coated, matte finish 5 polyester sheet, available from PCI were printed with an image in several ink jet printers, and evaluated for print quality, color intensity, drying time and image permanence. The results are presented below in Tables 7 and 8.

TABLE 3

Print Quality (PQ) and Color Intensity - Example 9

| | BLACK | | COLOR | | | | | | | | | | |
|---|---|---|---|---|---|---|---|---|---|---|---|---|---|
| | TEXT | AREA FILL | TEXT | AREA FILL | | | | COLOR INTENSITY AREA FILL D3 | | | | | |
| | A1 Overall | B1 Overall | C1 Overall | D1 Overall | D2 C to C | D3 Color | Total | | | | | | |
| PRINTER | PQ | PQ | PQ | PQ | Bleed | Intensity | Numerical | Blue | Green | Yellow | Cyan | Magenta | Red |
| HP 500C | 3 | 3 | 3 | 3 | 4 | 3 | 3.13 | 2 | 2 | 3 | 3 | 3 | 2 |
| HP 560C | 2 | 3 | 3 | 4 | 4 | 3 | 2.88 | 3 | 2 | 3 | 3 | 3 | 2 |
| HP 682C | 2 | 4 | 3 | 3 | 4 | 3 | 3.13 | 3 | 3 | 2 | 3 | 3 | 3 |
| HP 693C | 3 | 3 | 3 | 3 | 4 | 4 | 3.25 | 4 | 4 | 4 | 4 | 4 | 4 |
| HP 850C | 2 | 3 | 3 | 2 | 4 | 4 | 3.00 | | | | | | |
| HP 1200C | 3 | 3 | 4 | 3 | 4 | 4 | 2.50 | 4 | 4 | 4 | 4 | 4 | 4 |
| HP 1600C | 4 | 4 | 4 | 3 | 4 | 3 | 3.88 | 3 | 3 | 3 | 4 | 4 | 3 |
| BJ-200e | 3 | 3 | | | | 2 | — | | | | | | |
| BJC-600 | 3 | 3 | 3 | 3 | 4 | 4 | 3.25 | 4 | 4 | 4 | 4 | 4 | 4 |
| BJC 4200 | 3 | 3 | 4 | 3 | 4 | 4 | 3.50 | 3 | 3 | 4 | 4 | 4 | 4 |
| BJC 4200 photo | 3 | 4 | 4 | 3 | 3 | 4 | 3.63 | 4 | 4 | 4 | 4 | 4 | 4 |
| BJC 4200 Neon | 3 | 4 | 4 | 3 | 4 | 4 | 3.75 | 4 | 4 | 4 | 4 | 4 | 4 |
| Epson Stylus Color | 4 | 3 | 4 | 3 | 3 | 4 | 3.63 | 4 | 4 | 4 | 4 | 4 | 4 |
| Epson 2 | 4 | 3 | 4 | 3 | 4 | 2 | 3.50 | 2 | 2 | 2 | 2 | 2 | 2 |
| Epson 500 | 4 | 4 | 4 | 3 | 2 | 4 | 3.75 | 4 | 4 | 4 | 4 | 4 | 4 |
| Epson 1500 | 4 | 4 | 4 | 3 | 4 | 3 | 3.88 | 3 | 3 | 2 | 4 | 3 | 3 |

TABLE 4

Drying Time and Image Permanence -- Example 9

| | BLACK | | | | COLOR | | | | |
|---|---|---|---|---|---|---|---|---|---|
| | Drying Time (min:sec) | | Image Permanence | | Drying Time (min:sec) | | Image Permanence | | |
| | A2 | B2 | B3 | E1 | C2 | D4 | Drip Test E1 | | |
| PRINTER | Text | Area Fill | Optical Density | Drip Test | Text | Area Fill | Yellow | Cyan | Magenta |
| HP 500C | 0 | 2:10 | 1.58 | 0.212 | 0 | 0 | 0.09 | 0.102 | 0.13 |
| HP 560C | 0 | 0 | 1.49 | 0.26 | 0 | 0 | | | |
| HP 682C | 0 | | 1.39 | 0.044 | 0 | 0 | | | |
| HP 693C | 0 | | 1.35 | 0.059 | 0 | | 0.24 | 0.344 | 0.284 |
| HP 850C | 0 | | 1.33 | 0.042 | 0 | | 0.198 | 0.21 | 0.224 |
| HP 1200C | 0 | 0 | 1.19 | 0.03 | 0 | | 0.242 | 0.39 | 0.3 |
| HP-1600C | 0 | 0 | 1.38 | 0.04 | 0 | 0 | 0.256 | 0.52 | 0.3 |
| BJ-200e | 0 | | 1.48 | 0.37 | | | | | |
| BJC-600 | 0 | | 1.36 | 0.252 | 0 | | | | |
| BJC 4200 | 0 | 0 | 1.54 | 0.284 | 0 | 0 | | | |
| BJC 4200 Photo | 0 | 0 | 1.5 | 0.188 | 0 | 3:00 | 0.656 | 0.052 | 0.0925 |
| BJC 4200 Neon | 0 | 0 | 1.62 | 0.298 | 0 | 0 | 0.068 | 0.09 | 0.1 |
| Epson Stylus Color | 0 | 0 | 1.38 | 0.252 | 0 | 0 | | | |
| Epson 2 | 0 | 0 | 1.19 | 0.16 | 0 | 0 | | | |
| Epson 500 | 0 | 0 | 1.62 | 0.288 | 0 | 0 | | | |
| Epson 1500 | 0 | | 1.3 | 0.302 | 0 | 2:35 | | | |

TABLE 5

Print Quality (PQ) and Color Intensity -- Comparative Example 2

| | BLACK | | COLOR | | | | | | | | | | |
|---|---|---|---|---|---|---|---|---|---|---|---|---|---|
| | TEXT | AREA FILL | TEXT | AREA FILL | | | | COLOR INTENSITY AREA FILL D3 | | | | | |
| | A1 Overall | B1 Overall | C1 Overall | D1 Overall | D2 C to C | D3 Color | Total | | | | | | |
| PRINTER | PQ | PQ | PQ | PQ | Bleed | Intensity | Numerical | Blue | Green | Yellow | Cyan | Magenta | Red |
| HP 500C | 3 | 3 | 3 | 3 | 4 | 3 | 3.13 | 2 | 2 | 3 | 3 | 3 | 2 |
| HP 560C | 3 | 3 | 3 | 3 | 4 | 2 | 3.00 | 2 | 2 | 3 | 2 | 3 | 2 |
| HP 682C | 2 | 3 | 2 | 3 | 4 | 3 | 2.63 | 3 | 3 | 3 | 3 | 3 | 3 |
| HP 693C | 3 | 4 | 4 | 4 | 4 | 2 | 3.50 | 2 | 2 | 2 | 2 | 2 | 2 |
| HP-850C | 1 | 1 | 1 | 1 | 3 | 2 | 1.38 | | | | | | |
| HP 1200C | 3 | 3 | 4 | 3 | 4 | 3 | 3.38 | 3 | 3 | 2 | 3 | 3 | 3 |
| HP 1600C | 3 | 4 | 4 | 3 | 4 | 3 | 3.63 | 3 | 3 | 3 | 3 | 3 | 3 |
| BJ-200e | 3 | 3 | | | | 3 | 1.88 | | | | | | |
| BJC-600 | 4 | 3 | 4 | 3 | 2 | 2 | 3.25 | 2 | 2 | 2 | 2 | 2 | 2 |
| BJC 4200 | 4 | 4 | 4 | 2 | 1 | 2 | 3.38 | 2 | 2 | 2 | 2 | 2 | 2 |
| BJC 4200 photo | 4 | 4 | 4 | 1 | 1 | 2 | 3.38 | 1 | 1 | 1 | 1 | 1 | 1 |
| BJC 4200 Neon | 4 | 4 | 4 | 4 | 2 | 3 | 3.63 | 4 | 4 | 4 | 4 | 4 | 4 |
| Epson Stylus Color | 4 | 3 | 4 | 3 | 2 | 2 | 3.25 | 2 | 2 | 2 | 2 | 2 | 2 |
| Epson 2 | 4 | 3 | 3 | 2 | 3 | 1 | 3.00 | 1 | 1 | 1 | 1 | 1 | 1 |
| Epson 500 | 4 | 3 | 3 | 3 | 1 | 3 | 3.00 | 2 | 2 | 2 | 2 | 2 | 2 |
| Epson 1500 | 4 | 3 | 3 | 2 | 2 | 2 | 3.00 | 2 | 2 | 3 | 3 | 2 | 2 |

TABLE 6

Drying Time and Image Permanence -- Comparative Example 2

| | BLACK | | | | COLOR | | | | |
|---|---|---|---|---|---|---|---|---|---|
| | Drying Time (min:sec) | | Image Permanence | | Drying Time (min:sec) | | Image Permanence | | |
| | A2 | B2 | B3 | E1 | C2 | D4 | Drip Test E1 | | |
| PRINTER | Text | Area Fill | Optical Density | Drip Test | Text | Area Fill | Yellow | Cyan | Magenta |
| HP 500C | 0 | 0 | 1.31 | 0.232 | 0 | 0 | 0.098 | 0.136 | 0.172 |
| HP 560C | 0 | 0 | 1.35 | 0.184 | 0 | 0 | | | |
| HP 682C | 1:45 | 1:50 | 1.35 | 0.042 | 1:45 | 2:10 | 0.27 | 0.32 | 0.31 |
| HP 693C | :30 | 1:00 | 1.35 | 0.006 | 1:00 | 1:15 | 0.23 | 0.292 | 0.282 |
| HP 850C | :30 | 1:00 | 1.73 | 0.078 | 30 | 1.00 | 0.338 | 0.3 | 0.234 |
| HP 1200C | 1:00 | 1:30 | 1.26 | 0.02 | 15:00 | >30:00 | 0.038 | 0.1 | 0.104 |
| HP-1600C | 1:30 | 1:30 | 1.63 | 004 | 15:00 | >30:00 | 0.102 | 0.075 | 0.1025 |
| BJ-200e | 0 | 0 | 1.19 | 0.22 | | | | | |
| BJC-600 | 0 | :20 | 1.03 | 0.22 | 0 | :30 | | | |
| BJC 4203 | 0 | :15 | 1.25 | 0.326 | 10 | :30 | | | |
| BJC 4200 Photo | 0 | 0 | 1.34 | 0.228 | 0 | 8:30 | 0.15 | 0.202 | 0.082 |
| BJC 4200 Neon | 0 | 0 | 1.14 | 0.392 | 0 | 0 | 0.072 | 0.28 | 0.21 |
| Epson Stylus Color | 2:00 | 2:50 | 1.05 | 0.175 | 3:45 | 4:00 | | | |
| Epson 2 | 0 | :50 | 1.06 | 0.348 | 40 | 1:10 | | | |
| Epson 500 | 3:00 | 5:00 | 1.22 | 0.27 | 3:50 | 5:15 | | | |
| Epson 1500 | 0 | 0 | 1.16 | 0.54 | 2:30 | 3:00 | | | |

TABLE 7

Print Quality (PQ) and Color Intensity -- Comparative Example 3

| PRINTER | BLACK TEXT A1 Overall PQ | BLACK AREA FILL B1 Overall PQ | COLOR TEXT C1 Overall PQ | COLOR AREA FILL D1 Overall PQ | COLOR AREA FILL D2 C to C Bleed | COLOR AREA FILL D3 Color Intensity | Total Numerical | COLOR INTENSITY AREA FILL D3 Blue | Green | Yellow | Cyan | Magenta | Red |
|---|---|---|---|---|---|---|---|---|---|---|---|---|---|
| HP 500C | 3 | 4 | 3 | 3 | 4 | 3 | 3.36 | 3 | 3 | 3 | 3 | 3 | 3 |
| HP 560C | 3 | 4 | 3 | 3 | 4 | 3 | 3.36 | 3 | 3 | 3 | 3 | 3 | 3 |
| HP 682C | 2 | 4 | 3 | 3 | 4 | 4 | 3.25 | 4 | 4 | 4 | 4 | 4 | 4 |
| HP 693C | 3 | 4 | 3 | 3 | 4 | 3 | 3.38 | 3 | 3 | 3 | 3 | 3 | 3 |
| HP 850C | 2 | 3 | 3 | 3 | 4 | 3 | 2.88 | | | | | | |
| HP 1200C | 3 | 3 | 4 | 4 | 4 | 2 | 3.25 | 2 | 2 | 2 | 2 | 2 | 2 |
| HP 1600C | 4 | 4 | 4 | 4 | 4 | 3 | 3.88 | 3 | 3 | 3 | 3 | 3 | 3 |
| BJ-200e | 3 | 4 | | | | 3 | 2.13 | | | | | | |
| BJC-600 | 3 | 3 | 3 | 3 | 4 | 3 | 3.13 | 3 | 3 | 3 | 3 | 3 | 3 |
| BJC 4200 | 4 | 4 | 4 | 4 | 4 | 4 | 4.00 | 4 | 4 | 4 | 4 | 4 | 4 |
| BJC 4200 photo | 4 | 4 | 3 | 3 | 3 | 4 | 3.63 | 3 | 3 | 2 | 3 | 3 | 3 |
| BJC 4200 Neon | 4 | 4 | 4 | 4 | 4 | 3 | 3.88 | 3 | 3 | 1 | 3 | 3 | 3 |
| Epson Stylus Color | 4 | 3 | 3 | 3 | 4 | 4 | 3.50 | 4 | 4 | 4 | 4 | 4 | 4 |
| Epson 2 | 4 | 3 | 4 | 4 | 4 | 2 | 3.50 | 2 | 2 | 1 | 2 | 2 | 1 |
| Epson 500 | 3 | 4 | 3 | 3 | 3 | 3 | 3.25 | 3 | 3 | 2 | 3 | 3 | 2 |
| Epson 1500 | 4 | 4 | 4 | 4 | 4 | 4 | 4.00 | 4 | 4 | 4 | 4 | 4 | 4 |

TABLE 8

Drying Time and Image Permanence -- Comparative Example 3

| PRINTER | BLACK Drying Time (min:sec) A2 Text | BLACK Drying Time (min:sec) B2 Area Fill | BLACK Image Permanence B3 Optical Density | BLACK Image Permanence E1 Drip Test | COLOR Drying Time (min:sec) C2 Text | COLOR Drying Time (min:sec) D4 Area Fill | COLOR Image Permanence Drip Test E1 Yellow | Cyan | Magenta |
|---|---|---|---|---|---|---|---|---|---|
| HP 500C | 0 | 1:20 | 1.4 | 0.044 | 0 | 0 | 0.032 | 0.028 | 0.06 |
| HP 560C | 0 | 0 | 1.39 | 0.108 | 0 | 0 | | | |
| HP 682C | 0 | 1:00 | 1.29 | 0.018 | 0 | 0 | 0.352 | 0.294 | 02.92 |
| HP 693C | :15 | :30 | 1.38 | 0.02 | :15 | :30 | 0.348 | 0.234 | 0.202 |
| HP 850C | 0 | :30 | 1.15 | 0.02 | 0 | 0 | 0.468. | 0.206 | 0.242 |
| HP 1200C | 0 | 0 | 1.06 | 0.018 | 0 | 0 | 0.35 | 0.364 | 0.238 |
| HP-1600C | 0 | 0 | 1.31 | 0.008 | 0 | 0 | 0.414 | 0.336 | 0.238 |
| BJ-200e | 0 | 0 | 1.35 | 0.238 | | | | | |
| BJC-600 | 0 | 0 | 1.31 | 0.132 | 0 | :20 | | | |
| BJC 4200 | 0 | :20 | 1.43 | 0.048 | 0 | 0 | | | |
| BJC 4200 Photo | 0 | 0 | 1.42 | 0.048 | 0 | 3:50 | 0.038 | 0.024 | 0.192 |
| BJC 4200 Neon | 0 | 0 | 1.41 | 0.054 | 0 | 0 | 0 | 0.035 | 0.048 |
| Epson Stylus Color | 0 | 0 | 1.35 | 0.306 | 1:25 | 3:25 | | | |
| Epson 2 | 0 | :20 | 1.1 | 0.064 | 0 | 0 | | | |
| Epson 500 | 0 | :30 | 1.42 | 0.302 | 0 | 1:30 | | | |
| Epson 1500 | | 1:00 | 1.35 | 0.142 | 0 | 1:20 | | | |

The ink-receptive coated label product of Example 9 generally performed better than the uncoated label product (C-2) and comparable to the matte finish polyester product (C-3), with some differences in color intensities and drying times. Overall color intensities and drying times for Example 9 were comparable to C-3 and much better than C-2. Color intensities for Example 9 were better than both C-2 and C-3, while overall print quality was comparable to that of C-3 and even slightly better than that of C-2. A significant improvement in waterfastness was seen for Example 9 over C-2, but not C-3.

Water Resistance of Imprinted Vinyl Products

To simulate exposure of an ink-jet imprinted coated construction to rainy or wet conditions expected to be encounter outdoors by many wide format products, an ink-receptive, polyvinyl chloride construction (Example 10) was prepared, imaged with an ink-jet printer, and evaluated for color quality, both before and after twenty-four hour immersion in water.

Example 10

In Example 10, several samples of 3.4 mil, calendered, white polyvinyl chloride film were coated with an ink-receptive composition (prepared as in Example 9), to a dry coat weight of about 50 to 55 g/m$^2$, in a reverse roll coater. The samples were imprinted with a series of images by running the samples through a four-color ENCAD NOVA-JET PRO Printer containing ENCAD GO (graphic outdoor) ink. Color images with 100%, 50% and 25% ink coverage were printed on different samples, for each of the following colors: cyan, yellow, magenta, black, red (magenta+yellow), blue (magenta+cyan), and green (cyan+yellow). The printed image on each sample was evaluated for lightness and chromaticity using the L*a*b*color space (also referred to as the CIELAB color space), one of the uniform color spaces defined by the CIE in 1976. Lightness and chromaticity measurements were taken with a Colortron II color measurement device, made by Light Source Computer Images, Inc. (San Rafael, Calif.). The lightness measurement, L*, typically ranges from +100 to 0, with a higher number being whiter or brighter; a*chromaticity (red to green) and b* (yellow to blue) chromaticity coordinates each range from +100 to −100. A more complete description of the L*a*b* color space is found in Appendix A ("Precise Color Communication," Minolta Camera Co., Ltd., pp 18, 46, 47). Three separate measurements of each of L*, a* and b* were taken for each color image, and the average (mean) of the three values was recorded. After each sample was printed and evaluated for color space, it was placed in a vessel containing deionized water for 24 hours, allowed to dry, and new color space measurements were taken. The degree of color difference is denoted ΔE*, defined by the equation:

$$\Delta E^* = \sqrt{(\Delta L^*)^2 + (\Delta a^*)^2 + (\Delta b^*)^2}$$

where ΔL*, Δa* and Δb* are, respectively, the differences between the post- and pre-immersion values of L*, a* and b*. A small ΔE* is preferred and indicates little change in color after immersion. The results are presented in Table 9.

TABLE 9

Water Resistance of Imprinted Samples

| Color | Before Immersion L* | Before Immersion a* | Before Immersion b* | After 24 Hour Water Soak L* | After 24 Hour Water Soak a* | After 24 Hour Water Soak b* | ΔE* |
|---|---|---|---|---|---|---|---|
| 100% Cyan | 67.62 | −23.29 | −39.52 | 65.17 | −23.64 | −40.40 | 2.63 |
| 100% Yellow | 93.46 | −15.05 | 72.88 | 92.64 | −15.31 | 75.73 | 2.98 |
| 100% Magenta | 59.95 | 55.19 | −19.14 | 57.70 | 57.67 | −18.87 | 3.36 |
| 100% Black | 28.50 | 0.30 | 0.75 | 27.22 | 0.43 | 1.35 | 1.42 |
| 50% Cyan | 79.59 | −18.56 | −27.02 | 78.65 | −18.80 | −27.19 | 0.98 |
| 50% Yellow | 94.69 | −15.16 | 55.77 | 94.46 | −15.79 | 58.54 | 2.85 |
| 50% Magenta | 72.05 | 40.01 | −17.73 | 70.62 | 41.56 | −18.09 | 2.14 |

TABLE 9-continued

Water Resistance of Imprinted Samples

| Color | Before Immersion L* | Before Immersion a* | Before Immersion b* | After 24 Hour Water Soak L* | After 24 Hour Water Soak a* | After 24 Hour Water Soak b* | ΔE* |
|---|---|---|---|---|---|---|---|
| 50% Black | 59.41 | 0.15 | −2.04 | 57.82 | 0.17 | −0.74 | 2.05 |
| 25% Cyan | 89.53 | −8.76 | −14.41 | 88.35 | −8.86 | −13.92 | 1.28 |
| 25% Yellow | 96.12 | −9.79 | 26.88 | 95.41 | −10.05 | 27.96 | 1.32 |
| 25% Magenta | 84.22 | 21.33 | −11.87 | 83.03 | 21.31 | −11.30 | 1.32 |
| 25% Black | 79.42 | 0.06 | −2.70 | 78.12 | 0.06 | −1.82 | 1.57 |
| 100% Red | 59.88 | 40.03 | 30.21 | 57.86 | 42.08 | 31.16 | 3.03 |
| 100% Green | 62.28 | −56.10 | 29.17 | 60.58 | −57.10 | 28.09 | 2.25 |
| 100% Blue | 44.98 | 18.73 | −39.26 | 43.10 | 18.82 | −39.19 | 1.88 |
| 100% CMY | 41.80 | −7.62 | 8.28 | 39.58 | −6.46 | 6.01 | 3.38 |
| 50% Red | 71.26 | 27.30 | 21.93 | 70.16 | 27.60 | 24.82 | 3.11 |
| 50% Green | 77.35 | −41.29 | 24.62 | 76.09 | 42.37 | 27.01 | 2.91 |
| 50% Blue | 61.84 | 15.29 | −34.35 | 59.78 | 17.85 | −35.07 | 3.36 |
| 50% CMY | 60.04 | −3.27 | 2.06 | 58.33 | −2.72 | 3.62 | 2.38 |
| 25% Red | 83.46 | 12.26 | 13.21 | 82.75 | 12.13 | 14.21 | 1.23 |
| 25% Green | 88.48 | −20.37 | 13.89 | 87.64 | −20.57 | 15.20 | 1.57 |
| 25% Blue | 78.02 | 11.13 | −21.11 | 76.54 | 11.73 | −21.23 | 1.60 |
| 25% CMY | 77.17 | 0.53 | 2.88 | 76.09 | 0.79 | 4.39 | 1.87 |

As indicated in Table 9, the ink-receptive coated product of Example 10 exhibited little difference in image quality after 24 hour immersion in water, evidencing significant water resistance.

Throughout the text and the claims, use of the word "about" in relation to a range of numbers is intended to modify both the low and the high values stated.

What is claimed is:

1. A coatable, ink-receptive composition, comprising:

(a) a pigment, dispersed in or mixed with (b) a binder, comprising (i) an ethylene-vinyl acetate emulsion polymer, (ii) a water soluble copolymer having a formula (IV)

(IV)

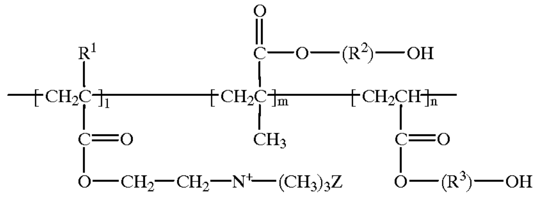

wherein $R^1$ is hydrogen or methyl, $-(R^2)-OH$ and $-(R^3)-OH$ are, independently, lower alkyl, alkenyl, alkynyl, or ether, substituted with a hydroxyl group at a primary or secondary carbon, 1>0, m≧0, n≧0, provided that m and n are not both zero, and Z is a monovalent or divalent counterion, and (iii) a polydiallyldimethylammonium compound.

2. A composition as recited in claim 1, wherein the copolymer (ii) is present in an amount of from 5 to 50% by weight (dry weight) of the composition.

3. A composition as recited in claim 1, wherein the poly(diallyldimethylammonium) compound contains counterions selected from the group consisting of halides, dimethyl sulfate anion, and mixtures thereof.

4. A composition as recited in claim 3, wherein the halide is chloride.

5. A composition as recited in claim 1, wherein the binder components (ii) and (iii) are present in a weight ratio of about 2:1.

6. A composition as recited in claim 1, wherein the ethylene-vinyl acetate emulsion polymer has a solids content of from about 40 to 75%.

7. A composition as recited in claim 1, wherein the ethylene-vinyl acetate emulsion polymer is present in an amount of from about 15 to 70% by weight (dry weight) of the composition.

8. A composition as recited in claim 1, wherein the emulsion polymer is stabilized with polyvinyl alcohol and/or a nonionic surfactant.

9. A composition as recited in claim 1, wherein the ethylene-vinyl acetate emulsion polymer is carboxylated.

10. A composition as recited in claim 1, wherein the binder further comprises (iv) at least one nonionic and/or cationic surfactant.

11. A composition as recited in claim 10, wherein the at least one nonionic or cationic surfactant is present in a total amount of up to about 10% by weight (dry weight) of the composition.

12. A composition as recited in claim 1, wherein the binder further comprises an ethoxylated nonionic surfactant and a cationic surfactant comprising hexadecyltrimethylammonium chloride.

13. A composition as recited in claim 1, wherein the pigment comprises an inorganic pigment.

14. A composition as recited in claim 13, wherein the pigment comprises an amorphous silica gel.

15. A composition as recited in claim 1, wherein the pigment is present in an amount of from about 20 to 60% by weight (dry weight) of the composition.

16. A composition as recited in claim 1, further comprising a second pigment.

17. A composition as recited in claim 16, wherein the second pigment is a colloidal dispersion silica.

18. A composition as recited in claim 1, wherein the binder further comprises a crosslinker.

19. A composition as recited in claim 18, wherein the crosslinker is selected from the group consisting of polyisocyanates, melamine formaldehyde resins, and urea formaldehyde resins.

20. A composition as recited in claim 1, wherein the composition comprises about 15 to 70% by weight of the ethylene-vinyl acetate emulsion polymer, about 5 to 50% by weight of the water soluble copolymer having formula (IV) and the poly (diallyldimethylammonium) compound;

about 20 to 50% by weight of one or more pigments; and up to about 10% by weight of one or more surfactants.

21. A composition as recited in claim 1, wherein $-(R^2)-OH$ is $-CH_2CH_2OH$, $-(R^3)-OH$ is $-CH_2CH_2OH$, m>0, and n>0.

22. A composition as recited in claim 21, wherein 1 is about 5 to 17, m is about 52 to 74, and n is about 18 to 37.

23. An ink-receptive construction, comprising:

a face stock or label stock, coated on at least one surface with an ink-receptive composition as recited in any one of claims 1–20.

24. an ink-receptive construction as recited in claim 23, wherein the face stock or label stock comprises a paper, film, cardboard, or corrugated board substrate.

25. An ink-receptive construction as recited in claim 23, wherein the face stock or label stock comprises a cast, extruded, or coextruded film of plastic selected from the group consisting of polystyrene, polyvinyl chloride, polyester, nylon, polyolefin and blends thereof, or coextruded polyolefin-polybutylene terephthalate.

26. An ink-receptive construction as recited in claim 23, wherein the construction is a label assembly comprising (i) a face stock having at least one inner surface and at least one outer surface, (ii) a pressure-sensitive adhesive adhered to at least one inner surface of the face stock, and (iii) a removable release liner abutting the pressure-sensitive adhesive, wherein the ink-receptive composition is coated on an outer surface of the face stock.

27. An ink-receptive construction as recited in claim 26, wherein a plurality of die cuts extend through the face stock and adhesive.

28. An imprinted construction, comprising:

a face stock or label stock, coated on at least one surface with an ink-receptive composition as recited in any one of claims 1–20, imprinted with a black and/or color image.

29. An imprinted construction as recited in claim 28, wherein the imprinted image is water-resistant.

30. A process for producing a water-resistant image for wide format or narrow format graphics, comprising:

coating a substrate with an ink-receptive composition as recited in any one of claims 1–20; and printing an image on the coated substrate.

31. A water soluble copolymer of a formula (IV):

(IV)

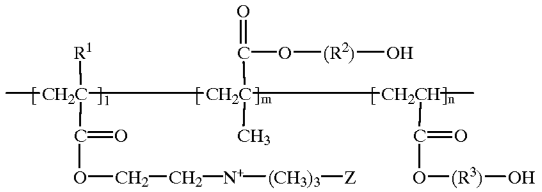

wherein $R_1$ is hydrogen or methyl; $-(R^2)-OH$ and $-(R^3)-OH$ are, independently, lower alkyl, alkenyl, alkynyl, or ether, substituted with a hydroxyl group at a primary or secondary carbon; 1>0; m≧0; n≧0, provided that m and n are not both zero; and Z is a monovalent or divalent counterion.

32. A copolymer as recited in claim 31, wherein $R^1$ is hydrogen, $R^2$ is $-CH_2CH_2-$, and $R^3$ is $-CH_2CH_2-$.

33. A copolymer as recited in claim 72, wherein 1 is about 5 to 17, m is about 52 to 74, and n is about 18 to 37.

34. A copolymer as recited in claim 31, wherein both m and n are >0.

35. A water-resistant, graphic image construction adhered to an object, the construction comprising:

(a) an imprintable substrate having first and second surfaces, (b) an ink-receptive composition coated on the first surface of the imprintable substrate, the composition comprising a pigment dispersed in a mixture of an ethylene-vinyl acetate emulsion polymer, a water soluble copolymer having a formula (IV)

(IV)

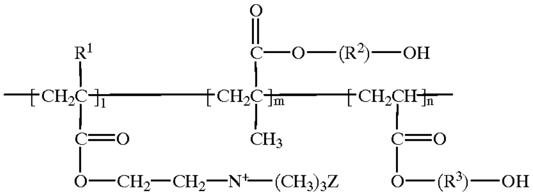

wherein $R^1$ is hydrogen or methyl, $-(R^2)-OH$ and $-(R^3)-OH$ are, independently, lower alkyl, alkenyl, alkynyl, or ether, substituted with a hydroxyl group at a primary or secondary carbon, 1>0, m≧0, n≧0, provided that m and n are not both zero, and Z is a monovalent or divalent counterion, and a poly (diallyldimethylammonium) compound, and (c) an adhesive coated on or applied to the second surface of the imprintable substrate and adhered to the object.

36. A water soluble copolymer having a formula (IV):

(IV)

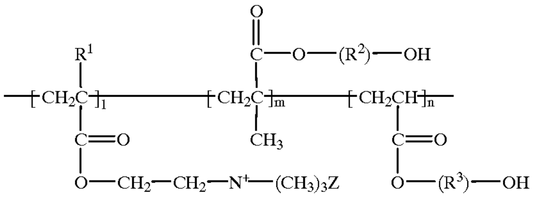

wherein $R^1$ is hydrogen or methyl, $-(R^2)-OH$ and $-(R^3)-OH$ are, independently, lower alkyl, alkenyl, alkynyl, or ether, substituted with a hydroxyl group at a primary or secondary carbon, 1 is about 5 to 17, m is about 52 to 74, n is about 18 to 37, and Z is a monovalent or divalent counterion.

* * * * *

UNITED STATES PATENT AND TRADEMARK OFFICE

CERTIFICATE OF CORRECTION

PATENT NO. : 6,153,288 
DATED : November 28, 2000
INVENTOR(S) : Frank Yen-Jer Shih and Kenneth S. C. Lin It is certified that error appears in the above-identified patent and that said Letters Patent is hereby corrected as shown below:

Column 21,
Line 59, replace "an ink-receptive" with -- An ink-receptive --.

Column 22,
Line 50, replace "claim 72" with -- claim 32 --.

Signed and Sealed this

Twenty-seventh Day of May, 2003

JAMES E. ROGAN
*Director of the United States Patent and Trademark Office*